United States Patent
Kawasaki et al.

[11] Patent Number: 5,838,956
[45] Date of Patent: Nov. 17, 1998

[54] CLOCK GENERATING CIRCUIT

[75] Inventors: Toshio Kawasaki; Shigemi Aizawa, both of Kawasaki, Japan

[73] Assignee: Fujitsu Limited, Kanagawa, Japan

[21] Appl. No.: 824,364

[22] Filed: Mar. 25, 1997

[30] Foreign Application Priority Data

Sep. 4, 1996 [JP] Japan .................................. 8-233521

[51] Int. Cl.[6] ...................................................... G06F 1/04
[52] U.S. Cl. .......................... 395/555; 395/556; 327/291
[58] Field of Search ..................................... 395/555, 556; 327/166, 167, 291

[56] References Cited

U.S. PATENT DOCUMENTS 5,651,031  7/1997  Ishizu ....................................... 375/328
5,663,945  9/1997  Hayashi et al. ......................... 369/124

Primary Examiner—Dennis M. Butler
Attorney, Agent, or Firm—Helfgott & Karas, P.C.

[57] ABSTRACT

A clock generating circuit which generates a clock signal with a desired frequency. An adder adds a first predetermined value to a previous value stored in flip-flops to create a current value (first value). A subtractor computes the difference between a value obtained by adding a second predetermined value to the first value and a third predetermined value and outputs the resultant difference value as a second value. The first value increases every time a reference clock pulse is input. The resultant values are sent to a memory device via a selector and the flip-flops. When the first value gradually increases and finally exceeds a third predetermined value, the selector selects the second value instead of the first value, where the third predetermined value is set to the maximum address value of the memory device.

14 Claims, 8 Drawing Sheets

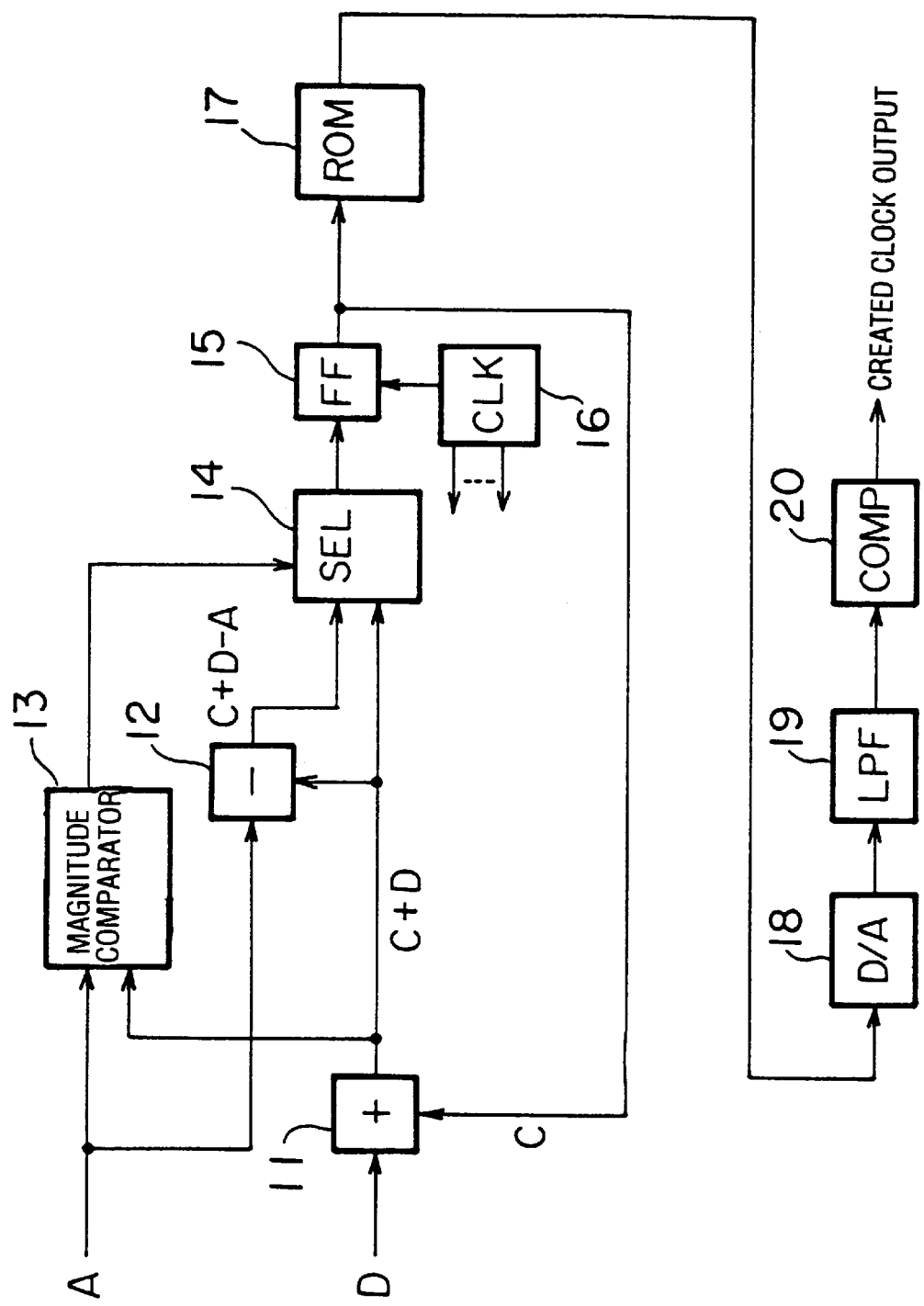
F I G. 2

CLOCK GENERATING CIRCUIT

BACKGROUND OF THE INVENTION

(1) Field of the Invention

The present invention relates to a clock generating circuit, and more particularly to a clock generating circuit for generating clock pulses having a desired frequency.

(2) Description of the Related Art

Today's communications systems handle a variety of digital signals of different transmission rates. Since such digital signals require various clock pulses having different frequencies, it has been demanded to provide a clock generating circuit which easily yields a clock signal with a desired frequency.

FIG. 7 is a block diagram illustrating an example of a conventional clock generating circuit. In FIG. 7, a reference clock oscillator 101 produces a reference clock signal of a frequency fs. A counter 102 counts the output clock pulses from the reference clock oscillator 101, and when the count value reaches a predetermined value M, the counter 102 resets itself to zero. That is, the counter 102 is a modulo-M counter. This counter value is supplied to a read-only memory (ROM) 103, which holds a sinusoidal wave data table for N cycle periods. The address input of the ROM 103 ranges from 0 to (M−1) and outputs sinusoidal wave data corresponding to each input address value. See FIG. 8, for example. If N=1, the ROM 103 outputs sinusoidal wave data for one cycle period, while the address changes from 0 to (M−1). If N=2, it produces two cycles, while the address varies from 0 to (M−1) as in the case of N=1.

The ROM 103 provides a digital-to-analog (D/A) converter 104 with the sinusoidal wave data corresponding to the count value of the counter 102. The D/A converter 104 converts the digital sinusoidal wave data into an analog signal. A low-pass filter 105 removes alias frequency components included in the analog sinusoidal wave signal. Then a comparator 106 creates a square wave by slicing the filtered sinusoidal wave signal at a predetermined threshold level, and finally outputs a clock pulse signal having a frequency fo. The frequency fo of the output clock signal is (N/M)fs. Hence, the clock generating circuit shown in FIG. 7 can obtain a clock signal with a desired frequency by properly setting the maximum address value M of the ROM 103 and the number of clock cycles (or the number of waves held in the ROM 103) N.

However, as understood from FIG. 8, in order to deal with a wide range of the number N, the ROM 103 must hold as many different sets of sinusoidal wave data as the number N. This apparently results in the increased cost of the ROM 103. Hence, there has been a strong demand for avoiding such a problem.

SUMMARY OF THE INVENTION

Taking the above into consideration, it is an object of the present invention to provide a clock generating circuit which can produce a clock signal having a desired frequency without increasing the amount of data held in a ROM.

In order to accomplish the above object, there is provided a clock generating circuit which generates a clock pulses of a desired frequency. The clock generating circuit comprises: adding means for adding a first predetermined value to an input value supplied thereto to obtain a first value; difference computing means coupled to the adding means for computing the difference between a value obtained by adding a second predetermined value to the first value and a third predetermined value to yield a second value; comparing means coupled to the adding means for comparing the first value with the third predetermined value; selecting means, coupled to the adding means, the difference computing means, and the comparing means, for selectively outputting the first value or the second value, based on the result of the comparison performed by the comparing means; delay means coupled to the selecting means for delaying the output value from the selecting means by a predetermined time and sending the delayed output value as the input value to the adding means; data holding means coupled to the delaying means for holding sinusoidal wave data to output the sinusoidal wave data corresponding to an address specified by the delayed output value received from the delay means; D/A converting means coupled to the data holding means for converting the sinusoidal wave data into an analog signal; extracting means coupled to the D/A converting means for extracting a signal having a predetermined frequency from the analog signal; and pulse converting means coupled to the extracting means for converting the signal having the predetermined frequency into a digital signal, thereby generating the clock signal with the desired frequency.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2 is a block diagram showing a specific configuration of a clock generating circuit according to a first embodiment of the present invention;

DESCRIPTION OF THE PREFERRED EMBODIMENTS

Embodiments of the present invention will now be described below with reference to the attached drawings.

Figure 1:
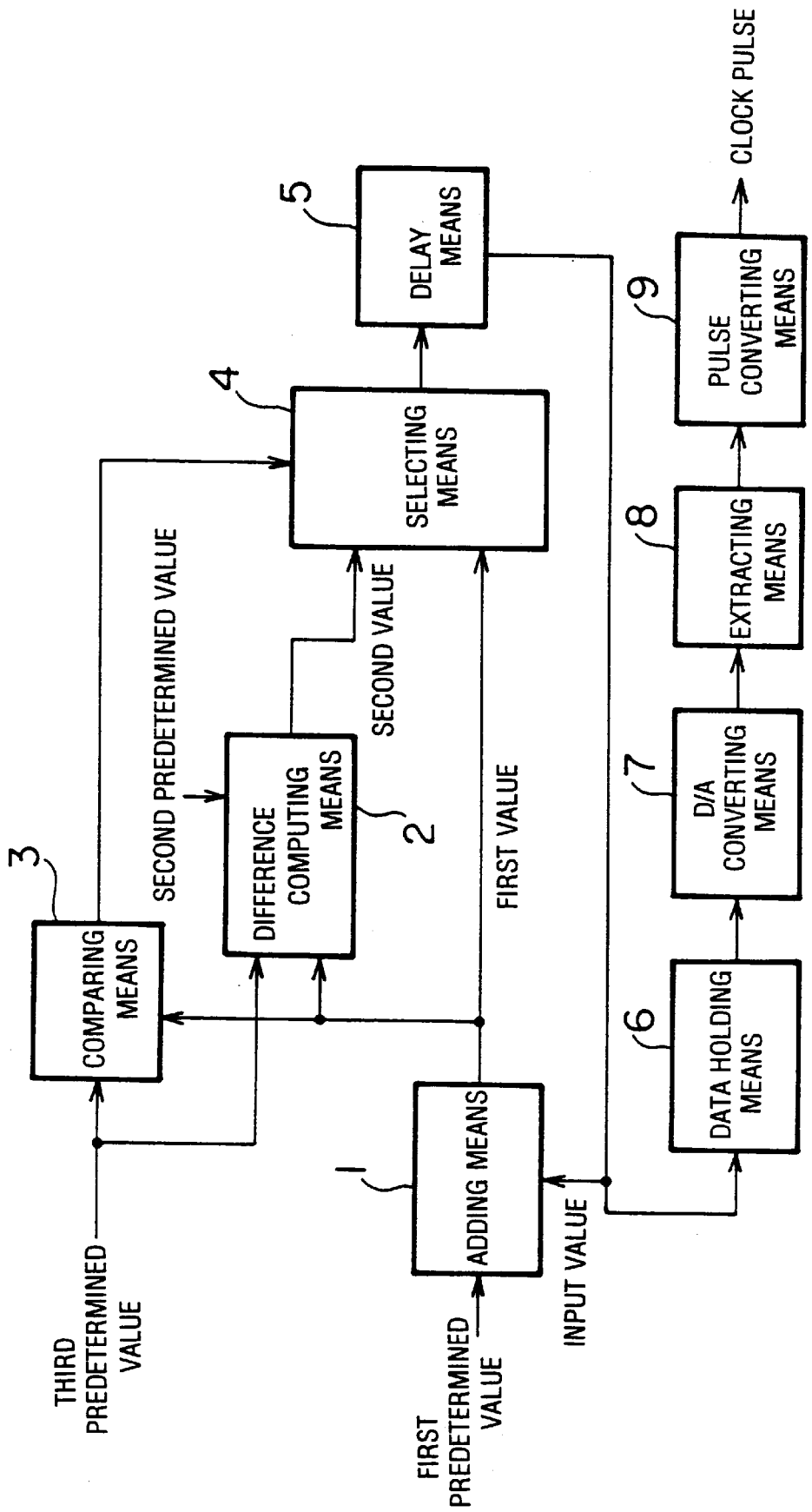
FIG. 1 is a diagram showing the principle of a clock generating circuit according to the present invention.

Referring first to FIG. 1, the principle configuration of a first embodiment is described below. In the first embodiment, the clock generating circuit comprises: adding means 1, difference computing means 2, comparing means 3, selecting means 4, delay means 5, data holding means 6, D/A converting means 7, extracting means 8, and pulse converting means 9. The adding means 1 calculates a first value by adding a first predetermined value to an input value supplied thereto to obtain a first value. The difference computing means 2, coupled to the adding means 1, computes the difference between a value obtained by adding a second predetermined value to the first value and a third predetermined value, thereby yielding a second value. The comparing means 3, coupled to the adding means, compares the first value with the third predetermined value. The selecting means 4, coupled to the adding means, the difference computing means, and the comparing means, selectively outputs the first value or the second value, based on the result of the comparison performed by the comparing means 3. The delay means 5, coupled to the selecting means 4, delays the output value of the selecting means 4 by a predetermined time and sends the delayed output value as the input value to the adding means 1. The data holding means 6, coupled to the delaying means, holds sinusoidal wave data to output the sinusoidal wave data corresponding to an address specified by the delayed output value received from the delay means 5. The D/A converting means 7, coupled to the data holding means, converts the sinusoidal wave data into an analog signal. The extracting means 8, coupled to the D/A converting means 7, extracts a signal having a predetermined frequency from the analog signal. The pulse converting means 9, coupled to the extracting means 8, converts the signal having the predetermined frequency into a digital signal, thereby generating the clock signal with the desired frequency.

In the above-described arrangement, the clock generating circuit operates in synchronization with a given reference clock signal. The adding means 1 adds a first predetermined value to its input value which is output from the delay means 5 and creates a first value. The difference computing means 2 computes the difference between the value obtained by adding a second predetermined value to the first value and a third predetermined value. The resultant difference value is referred to as a second value.

Normally, the first value increases every time a predetermined reference clock pulse is input to this clock generating circuit. The increased first value is sent to the data holding means 6 via the selecting means 4 and delay means 5. The data holding means 6 outputs to the D/A converting means 7 sinusoidal wave data held at an address corresponding to the first value. The D/A converting means 7 converts this digital data into an analog signal. The extracting means 8 extracts a predetermined frequency component among those contained in the output signal of the D/A converting means 7. Then the pulse converting means 9 converts the extracted signal into a clock pulse train.

As described above, the first value gradually increases and finally reaches or exceeds the third predetermined value, which situation is detected by the comparing means 3. The selecting means 4 selectively outputs the second value based on the detection result. Since this second value, by definition, is smaller than the third predetermined value, the selector output value always stays below the third predetermined value. The third predetermined value is an integer immediately above the maximum address value of the data holding means 6. When it is selected, the second value reaches the data holding means 6 via the selecting means 4 and the delay means 5, where the second value will be processed in the same manner as the first value is done.

As described above, the pulse converting means 9 produces a clock signal with the predetermined frequency according to the magnitude of the first predetermined value.

Since the data holding means 6 only has to hold sinusoidal wave data for a single cycle period, a clock signal with a desired frequency can be obtained without increasing the amount of data held in the data holding means 6.

FIG. 2 is a block diagram illustrating a specific configuration of a clock generating circuit according to a first embodiment of the present invention. The relationship between the configuration shown in FIG. 2 and the configuration shown in FIG. 1 will be described after explanation of the configuration shown in FIG. 2.

Referring to FIG. 2, an adder 11 receives a constant increment value D as an addend, as well as accepting a variable C as an augend from a flip-flop group 15 which is described later. The increment D is an arbitrary value provided from an external source to decide the frequency of the clock signal to be finally created. The adder 11 calculates the sum of the input variable C and the increment D and outputs the result (C+D) to a subtractor 12, the magnitude comparator 13 and the selector 14. Receiving a constant A as a subtrahend from the external source, the subtractor 12 obtains the difference value (C+D−A) by subtracting the constant A from the value (C+D), which difference value is then supplied to the selector 14. The magnitude comparator 13 also receives the constant A and compares the value (C+D) with the constant A, thereby outputting the comparison result to the selector 14. The selector 14 outputs selectively the value (C+D) or (C+D−A) to the flip-flop group 15 depending on the comparison result. When the magnitude comparator 13 shows that the value (C+D) is smaller than the constant A, the selector 14 outputs the value (C+D) as is. When, in turn, the value (C+D) is equal to or greater than the constant A, the value (C+D−A) is selectively output to the flip-flop group 15. A clock generator 16 sends reference clock pulses to the flip-flop group 15. The flip-flop group 15 samples the output of the selector 14 at every reference clock timing and temporarily holds the sampled value for one reference clock period. In other words, the flip-flop group 15 delays the output value of the selector 14 by one cycle period of the reference clock. Although not shown in FIG. 2, the clock generator 16 distributes the reference clock pulses to other components.

A ROM 17 is a memory device that holds data representing a sinusoidal wave for one cycle period, which are read out by using an address ranging from 0 to (A−1). Because of its periodicity, the sinusoidal wave held in the ROM 17 can involve any phase shift values. The ROM 17 is actually addressed by the output of the flip-flop group 15, and its data output is provided to the D/A converter 18. The D/A converter 18 converts the input digital value into an analog signal and outputs it to the low-pass filter 19. Since the conversion is performed at discrete timings, the analog output signal of the D/A converter 18 contains alias frequency components. That is, when the desired frequency of the clock signal finally created is represented as fo (fo<fs) and the frequency of a reference clock created by the clock generator 16 is fs, the analog signal includes unwanted high frequencies of (n×fs±fo), where n is an integer greater than zero. The low-pass filter 19 removes those alias components and supplies only the fundamental frequency fo to the comparator 20. The comparator 20 creates clock pulses by slicing the obtained sinusoidal wave with a predetermined threshold value to convert it into a square wave signal. The frequency fo of the finally created clock signal output from the comparator 20 is represented as (D/A)fs.

The relationships between the elements shown in FIG. 1 and those in FIG. 2 will now be clarified as follows. The adding means 1 shown in FIG. 1 corresponds to the adder 11 shown in FIG. 2. The reference computing means 2 shown in FIG. 1 corresponds to the subtractor 12 shown in FIG. 2.

The comparing means 3 shown in FIG. 1 corresponds to the magnitude comparator 13 shown in FIG. 2. The selecting means 4 shown in FIG. 1 corresponds to the selector 14 shown in FIG. 2. The delay means 5 shown in FIG. 1 corresponds to the flip-flop group 15 shown in FIG. 2. The data holding means 6 shown in FIG. 1 corresponds to the ROM 17 shown in FIG. 2. The D/A converting means 7 shown in FIG. 1 corresponds to the D/A converter 18. The extracting means 8 shown in FIG. 1 corresponds to the low-pass filter 19 shown in FIG. 2. The pulse converting means 9 shown in FIG. 1 corresponds to the comparator 20 shown in FIG. 2.

Furthermore, the adder input value in FIG. 1 corresponds to the variable C in FIG. 2. The first predetermined value corresponds to the constant increment D. The third predetermined value corresponds to the constant A. The first value corresponds to the value (C+D). The second value corresponds to the value (C+D−A). The second predetermined value corresponds to zero in the first embodiment.

Figure 3:
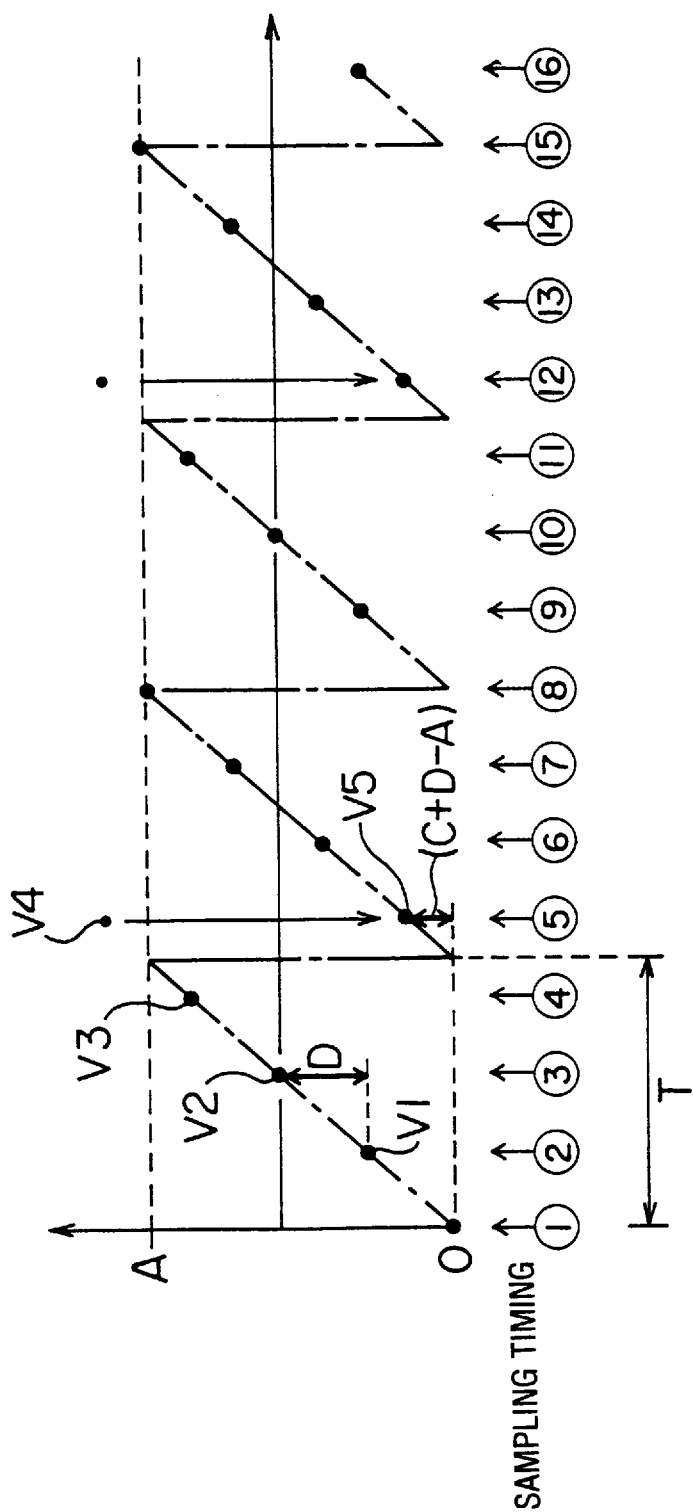
FIG. 3 is a diagram showing a specific operation of the clock generating circuit according to the first embodiment of the present invention.

FIG. 3 shows the operation of the clock generating circuit of the first embodiment, illustrating how the output of the selector 22 will change with time. Note here that the clock generating circuit operates at constant sampling intervals based on the reference clock generated by the clock generator 16, as represented by a series of timing numbers (1) to (16) in FIG. 3. The output of the selector 22, therefore, varies just discretely, or stepwise. At the sampling timing (3), for example, a value V2 is obtained by adding the increment D to the previous value V1 of the variable C held in the flip-flop group 15. Then the magnitude comparator 13 compares this value V2 with the constant value A. Since the value V2 at the sampling timing (3) is less than the constant threshold A, the selector 14 selects the value V2 and sends it to the flip-flop group 15.

On the other hand, at the sampling timing (5), the value V4 is obtained by adding the increment D to the previous value V3 held in the flip-flop group 15. The magnitude comparator 13 compares the obtained value V4 with the constant A, and it detects at this time that the value V4 exceeds this threshold A. Then the selector 14 selects the value (C+D−A) and outputs it to the flip-flop group 15. This value (C+D−A), or the value V5, is supplied to the flip-flop group 15 as the next value.

The flip-flop group 15 delays the output signal of the selector 14 by one reference clock interval and sends the delayed signal to the ROM 17 to convert it into digital sinusoidal wave data.

When the reference clock interval is short enough, the values input to the flip-flop group 15 will vary as indicated by alternating long and short dashes in FIG. 3. As seen from this sawtooth waveform, the values output from the selector 14 exhibit periodicity. This period T of the sawtooth wave directly corresponds to the cycle period of the desired clock signal which is output from the comparator 20.

The frequency fo of the clock generated by the above-described clock generating circuit is defined by the magnitude of the increment D. Such a structural arrangement of the present invention requires the ROM 17 to have sinusoidal wave data not for plural cycle periods but only for a single cycle time, thus enabling a desired clock frequency to be obtained without increasing the amount of data stored in the ROM 17.

Figure 4:
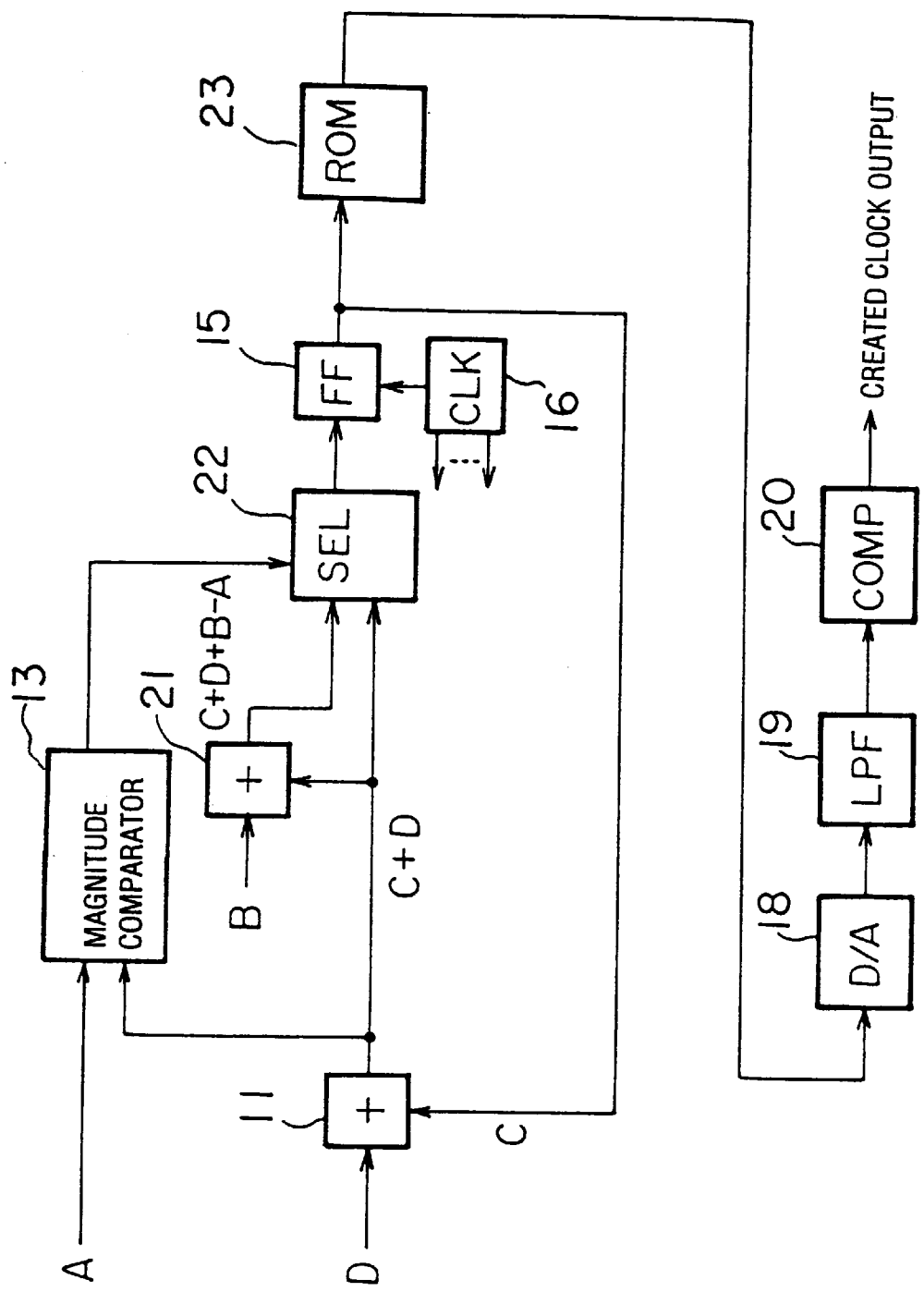
FIG. 4 is a block diagram showing a configuration of a clock generating circuit according to a second embodiment of the present invention.
Figure 5:
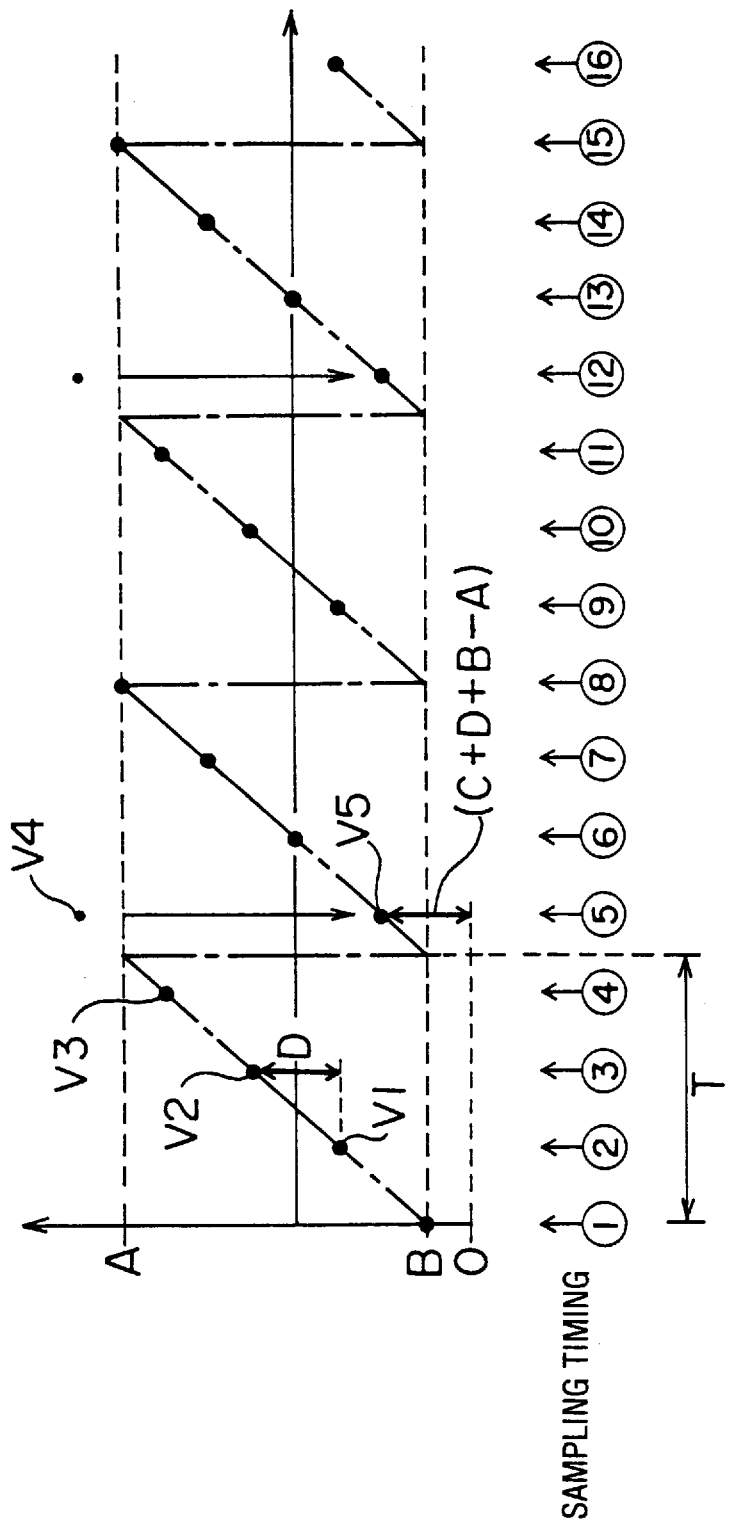
FIG. 5 is a diagram showing a specific operation of the clock generating circuit according to the second embodiment of the present invention.

Referring next to FIGS. 4 and 5, a second embodiment of the present invention will be described below. The principle configuration of the second embodiment is identical to the configuration shown in FIG. 1. As opposed to the first embodiment, the second embodiment allows the second predetermined value in FIG. 1 to be set to an arbitrary value.

FIG. 4 is a block diagram showing a configuration of the clock generating circuit according to the second embodiment. The configuration of the second embodiment is basically identical to that of the first embodiment shown in FIG. 2. Hence, the detailed explanation will be omitted concerning their common elements, and the following description will focus on the distinctive points, while attaching like reference numerals to like elements.

In the second embodiment, an adder 21 receives a predetermined constant B, as well as receiving the value (C+D) from the adder 11. This constant B corresponds to the second predetermined value in FIG. 1. The adder 21 obtains the value (C+D+B) by adding the constant B to the value (C+D). The adder 21 is such an adder that the sum will overflow when it reaches a constant A which is set to the n-th power of 2. Therefore, the output value of the adder 21 equals (C+D+B) while (C+D+B)<A, but if (C+D+B)≧A, the adder 21 outputs the value (C+D+B−mA), where m is a natural number.

The selector 22 selectively outputs the value (C+D) or (C+D+B−mA) to the flip-flop group 15 depending on the comparison result sent from the magnitude comparator 13. More specifically, the selector 22 outputs the value (C+D) as is when it is less than the constant A, while it selects the value (C+D+B−mA) when the value (C+D) is equal to or greater than the constant A.

A ROM 23 is a memory device which holds data representing the sinusoidal waveform for one cycle period, which are retrieved by using an address ranging from B to (A−1).

FIG. 5 illustrates an operation of the clock generating circuit of the second embodiment. For example, at the sampling timing (3), the value V2 is obtained by adding the increment D to the previous value V1 held in the flop-flop group 15. This value V2 is compared with the constant A by means of the magnitude comparator 13. Since the value V2 is less than the constant value A, the selector 22 selects the value V2 and outputs it to the flip-flop group 15.

On the other hand, at the sampling timing (5), the value V4 is produced by adding the increment D to the previous value V3 held in the flip-flop group 15. The magnitude comparator 13 compares the current value V4 with the constant A, and it detects at this time that the current value V4 exceeds the constant A. The selector 14 outputs the value (C+D+B−A) to the flip-flop group 15. The value (C+D+B−A) is shown in FIG. 5 as the value V5.

When the reference clock interval is short enough, the values input to the flip-flop group 15 will vary with time as indicated in FIG. 5 by alternating long and short dashes. As understood from this graph, the values input to the flip-flop group 15 exhibit periodicity. The cycle period T derives the cycle period of the clock signal finally output from the comparator 20.

The frequency fo of the clock signal generated from the above-described clock generating circuit can be set by the magnitude of the increment value D. Such a structural arrangement of the present invention requires the ROM 23 to store sinusoidal wave data not for plural periods but for only one cycle period.

The second embodiment uses such an adder that overflows when the result exceeds the predetermined constant A−1 (=$2^n$−1). Hence, the clock generating circuit of the second embodiment can be designed easier when compared with the first embodiment,.

The low-pass filter 19 is employed in both the first and second embodiments. As an alternate configuration, this low-pass filter 19 can be replaced with a band-pass filter which passes only a signal component having a particular alias frequency, say (fs-fo). This configuration enables a clock signal with a frequency higher than fo to be easily created.

Next, explanation will be made below for a clock generating circuit according to a third embodiment.

Figure 6:
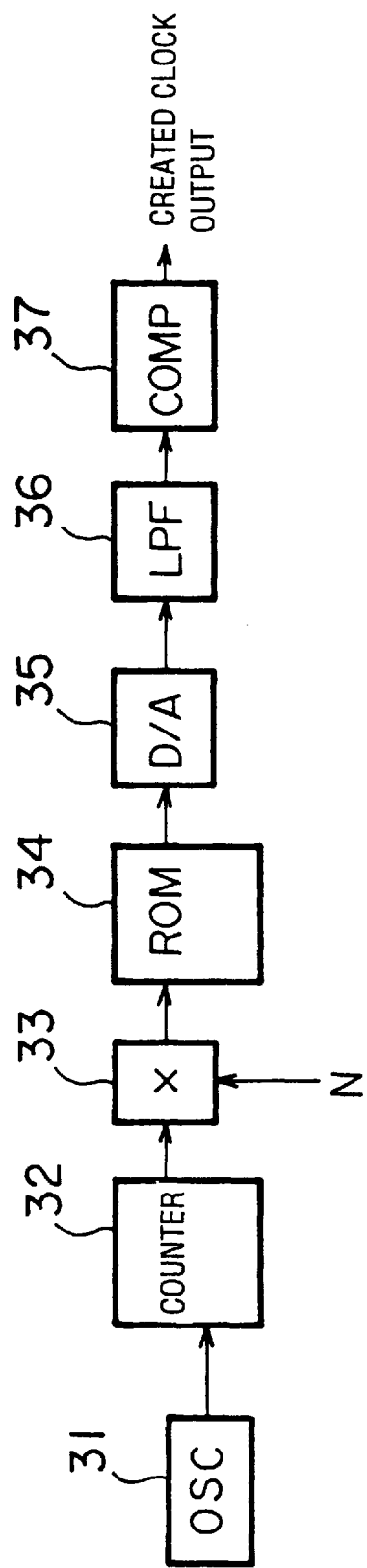
FIG. 6 is a diagram showing a configuration of a clock generating circuit according to a third embodiment of the present invention.
Figure 7:
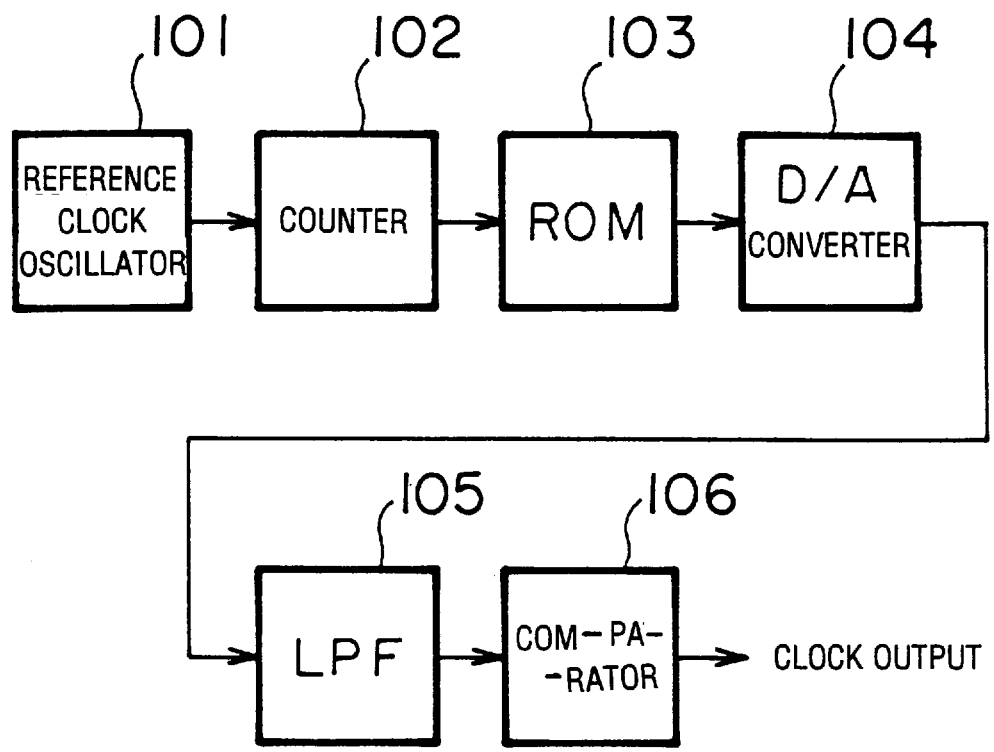
FIG. 7 is a block diagram showing a configuration of a conventional clock generating circuit.
Figure 8:
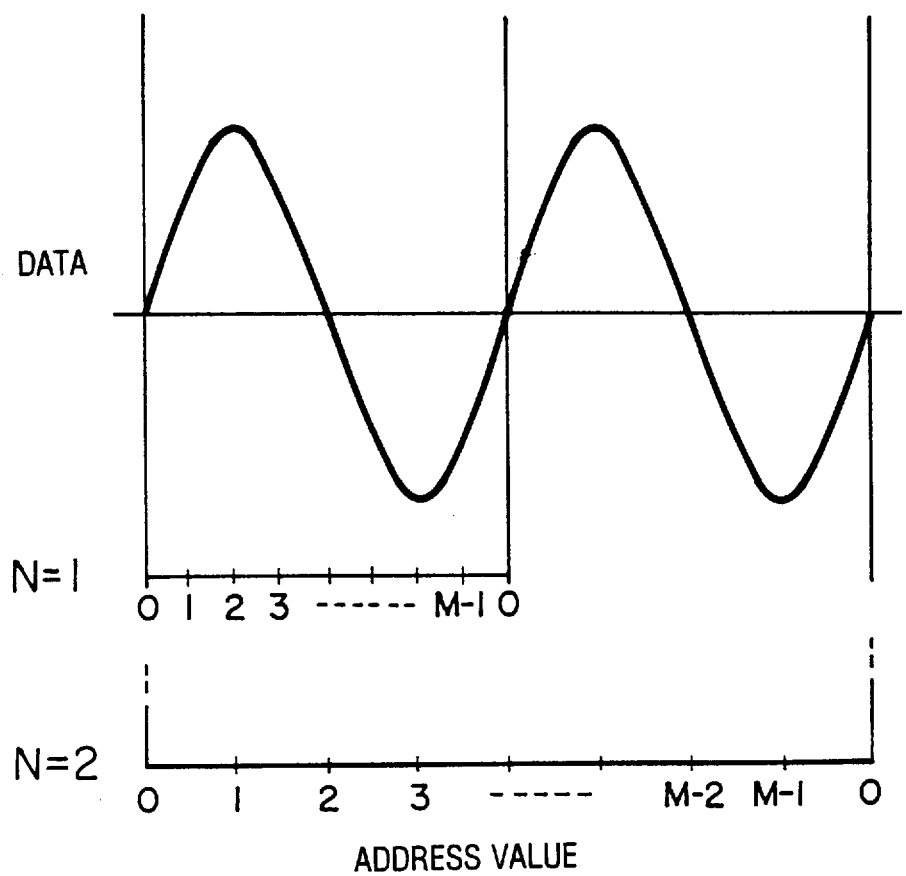
FIG. 8 is a diagram showing the operation of the conventional clock generating circuit.

FIG. 6 is a block diagram showing a configuration of the clock generating circuit according to the third embodiment. Referring to FIG. 6, a reference clock generator 31 generates a reference clock signal with a frequency fs. A counter 32 counts clock pulses output from the reference clock generator 31 and outputs the resultant count value at all times. When reaching a predetermined value M, the count value is reset to zero. A multiplier 33 multiplies the count value delivered from the counter 32 by a value N provided from an external source. When the product exceeds a predetermined value (M−1), the product will overflow and only a lower-digit value will remain. Assume that M=256, N=2, and the current counter value is 129, for example. The true product is calculated as 129×N=258, but the multiplier 33 will actually output 258−M=2. In general, the overflow will cause a subtraction of an integer multiple of the value M from the true product value. Hence, the output value of the multiplier 33 ranges from 0 to (M−1) regardless of the multiplier value N.

A ROM 34 is a memory device which holds sinusoidal wave data for one cycle, which are retrieved by using address values ranging from 0 to (M−1). Each time the multiplier 32 outputs a new product value, data stored at the address specified by the product value is supplied to the D/A converter 35. The D/A converter 35 converts the data into an analog signal. A low-pass filter 36 removes alias frequency components included in the converted analog signal. A comparator 37 outputs a clock signal having a frequency fo=(N/M)fs by creating a square wave by slicing the output signal of the low-pass filter 36 at a predetermined threshold level.

That is, even when the multiplier value N is changed, the value input to the ROM 34 always changes from zero to the constant value (M−1). On the other hand, increasing the value N will raise the rate of the address values supplied to the ROM 34. As such, the frequency fo of the clock generated by the clock generating circuit of FIG. 6 depends on the multiplier value N. There is no need for the ROM 34 to hold sinusoidal wave data for plural periods. The clock generating circuit can set the clock frequency fo arbitrarily by changing the multiplier value N, while using the same sinusoidal wave data for one cycle period.

In the above-described third embodiment, the low-pass filter 36 is employed to extract the fundamental frequency fo from the sinusoidal wave signal. As an alternate arrangement of this third embodiment, a band-pass filter which passes only a particular alias frequency, say (fs-fo), may be employed to replace the low-pass filter 36. This configuration enables a clock signal with a frequency higher than the fundamental frequency fo to be easily created.

As described above, according to the present invention, adding means generates a current value (first value) by adding a predetermined value (first predetermined value) to a previous value. Further, when the current value exceeds a predetermined maximum address value (third predetermined value) of data holding means (ROM), another value (second value) is created by subtracting the current value (first value) from the maximum value to replace the current value (first value). The digital sinusoidal wave data is extracted from data holding means (ROM) based on the current values (first value and second value).

Therefore, by only changing the predetermined value (first predetermined value), a clock signal with any desired frequency can be obtained without increasing the amount of data held in the ROM.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A clock generating circuit which generates a clock signal with a desired frequency, comprising:

adding means for adding a first predetermined value to an input value supplied thereto to obtain a first value;

difference computing means coupled to said adding means for computing the difference between a value obtained by adding a second predetermined value to said first value and a third predetermined value to yield a second value;

comparing means coupled to said adding means for comparing said first value with said third predetermined value;

selecting means, coupled to said adding means, said difference computing means, and said comparing means, for selectively outputting said first value or said second value, based on the result of the comparison performed by said comparing means;

delay means coupled to said selecting means for delaying the output value of said selecting means by a predetermined time and sending the delayed output value as said input value to said adding means;

data holding means coupled to said delaying means for holding sinusoidal wave data to output the sinusoidal wave data corresponding to an address specified by the delayed output value received from said delay means;

D/A converting means coupled to said data holding means for converting the sinusoidal wave data into an analog signal;

extracting means coupled to said D/A converting means for extracting a signal having a predetermined frequency from the analog signal; and pulse converting means coupled to said extracting means for converting the signal having the predetermined frequency into a digital signal, thereby generating the clock signal with the desired frequency.

2. The clock generating circuit as claimed in claim 1, wherein said first predetermined value is externally adjusted to set the desired frequency of said clock signal generated by said pulse converting means.

3. The clock generating circuit as claimed in claim 1, wherein said second predetermined value is zero.

4. The clock generating circuit as claimed in claim 1, wherein said difference computing means comprises adding means for adding said second predetermined value to said first value, said adding means being an adder whose output value will be reset to zero when the addition result exceeds said third predetermined value.

5. The clock generating circuit as claimed in claim 1, wherein said selecting means selects said first value when said first value is equal to or less than said third predetermined value, and selects said second value when said first value exceeds said third predetermined value, as a result of the comparison of said comparing means.

6. The clock generating circuit as claimed in claim 1, wherein said third predetermined value is set to a maximum address value that said data holding means accepts.

7. The clock generating circuit as claimed in claim 1, wherein said data holding means holds data for one cycle period of a sinusoidal wave.

8. The clock generating circuit as claimed in claim 1, wherein said extracting means comprises a filter which blocks alias frequency components included in the analog signal received from said D/A converting means and passes the desired frequency of the clock signal.

9. The clock generating circuit as claimed in claim 1, wherein said extracting means comprises a filter which passes a specific alias frequency component included in the analog signal received from said D/A converting means and blocks other frequency components included therein.

10. A clock generating circuit which generates a clock signal with a desired frequency, comprising:

reference clock generating means for generating reference clock pulses;

counting means for counting the reference clock pulses received from said reference clock generating means and to output a count value thereof, which is reset to zero when the count value exceeds a first predetermined value;

multiplying means for multiplying the count value of said counting means by a second predetermined value to produce a multiplied count value;

data holding means for holding sinusoidal wave data, and outputting the sinusoidal wave data corresponding to an address specified by the multiplied count value;

D/A converting means for converting the sinusoidal wave data output from said data holding means into an analog signal;

extracting means for extracting a signal having a predetermined frequency form the analog signal received from said D/A converting means; and pulse converting means for converting the signal having the predetermined frequency extracted by said extracting means into digital clock pulses, thereby obtaining the clock signal with the desired frequency.

11. The clock generating circuit as claimed in claim 10, wherein said multiplying means subtracts a maximum address value from a multiplication result thereof when said multiplication result exceeds the maximum address value that said data holding means accepts, and outputs the subtracted result as the multiplied count value.

12. The clock generating circuit as claimed in claim 10, wherein said data holding means holds data for a single cycle period of a sinusoidal wave.

13. The clock generating circuit as claimed in claim 10, wherein said extracting means comprises a filter which blocks alias frequency components included in the analog signal received from said D/A converting means and passes the desired frequency of the clock signal.

14. The clock generating circuit as claimed in claim 10, wherein said extracting means comprises a filter which passes a specific alias frequency component included in the analog signal received from said D/A converting means and blocks other frequency components included therein.

* * * * *